United States Patent
Afrasiabi et al.

(10) Patent No.: US 10,643,329 B2
(45) Date of Patent: May 5, 2020

(54) AUTOMATED PAINT QUALITY CONTROL FOR AIRCRAFT

(71) Applicant: The Boeing Company, Chicago, IL (US)

(72) Inventors: Amir Afrasiabi, Seattle, WA (US); Hieu Tat Nguyen, Madison, AL (US); Shabnam Zangeneh-Khamooshi, Everett, WA (US); Ashutosh Mani, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 87 days.

(21) Appl. No.: 15/948,386

(22) Filed: Apr. 9, 2018

(65) Prior Publication Data

US 2019/0311469 A1 Oct. 10, 2019

(51) Int. Cl.
*G06K 9/00* (2006.01)
*G06T 7/00* (2017.01)

(52) U.S. Cl.
CPC ............ *G06T 7/001* (2013.01); *G06T 7/97* (2017.01); *G06T 2207/30156* (2013.01)

(58) Field of Classification Search
None
See application file for complete search history.

(56) References Cited

U.S. PATENT DOCUMENTS

| | | | |
|---|---|---|---|
| 6,804,413 B1* | 10/2004 | Horie | G06T 11/60 382/284 |
| 8,902,254 B1 | 12/2014 | Laughlin et al. | |
| 9,646,431 B2 | 5/2017 | Schwartz et al. | |
| 9,776,738 B2 | 10/2017 | Schwartz et al. | |
| 2013/0077829 A1* | 3/2013 | Cramblitt | G06T 5/10 382/104 |
| 2013/0301902 A1* | 11/2013 | Oostendorp | G06T 7/001 382/141 |
| 2014/0341475 A1* | 11/2014 | Shen | G06F 16/583 382/218 |

OTHER PUBLICATIONS

Lin et al., "Separation of diffuse and specular reflection in color images," IEEE, 2001, pp. I-341-I-346.
(Continued)

*Primary Examiner* — Hadi Akhavannik
(74) *Attorney, Agent, or Firm* — MH2 Technology Law Group LLP

(57) ABSTRACT

According to various embodiments, a technique for automated aircraft paint application quality inspection is presented. The technique includes retrieving from electronic persistent storage a control image depicting at least a portion of aircraft paint application for the aircraft under quality inspection; capturing a process image depicting at least a portion of aircraft paint application on the aircraft under quality inspection; detecting a plurality of features in the control image and the process image; registering the control image with the process image; detecting at least one difference between the control image and the process image; generating an output image, where the output image includes a depiction of the aircraft under quality inspection with the at least one difference annotated; and causing the output image to be displayed.

20 Claims, 12 Drawing Sheets

(56) References Cited

OTHER PUBLICATIONS

Newman et al., "A survey of Automated Visual Inspection," Computer Vision and Image Understanding, vol. 61, No. 2, Mar. 1995, pp. 231-262.
European Search Report dated Jul. 18, 2019 in corresponding European Application No. 19157970.5, 3 pages.
Communication pursuant to Article 94(3) EPC dated Aug. 2, 2019 in corresponding European Application No. 19 157 970.5, 6 pages.
Leutert et al., "Augmented Reality for Telemaintenance and -Inspection in Force-Sensitive Industrial Robot Applications," Science Direct, IFAC Papers Online, pp. 153-158, Oct. 2016.
Vora et al., "Using virtual reality technology for aircraft visual inspection training: presence and comparison studies," Abstract, NCBI, Nov. 2002, 1 page.

* cited by examiner

AUTOMATED PAINT QUALITY CONTROL FOR AIRCRAFT

FIELD

This disclosure relates generally to aircraft paint application and associated quality control.

BACKGROUND

Existing visual inspection of paint livery in aircraft final assembly relies primarily on human visual acuity and can therefore be subjective. In addition, paint quality inspection processes for aircraft can be impacted by human interpretation. Because, for many aircraft, decorative paint is on the critical path of the delivery process, the ability promptly identify and address paint quality issues can minimize potential delays due to rework. In addition, there is a need for a consistent quality inspection process that can be implemented not only at a manufacturer's facility but also at offload paint application sites, where there may be less expertise on potential issues and inspection criteria than at the manufacturer's site.

SUMMARY

According to various embodiments, a method of automated aircraft paint application quality inspection is presented. The method includes retrieving from electronic persistent storage a control image depicting at least a portion of aircraft paint application for the aircraft under quality inspection; capturing a process image depicting at least a portion of aircraft paint application on the aircraft under quality inspection; detecting a plurality of features in the control image and the process image; registering the control image with the process image; detecting at least one difference between the control image and the process image; generating an output image, wherein the output image comprises a depiction of the aircraft under quality inspection with the at least one difference annotated; and causing the output image to be displayed.

Various optional features of the above embodiments include the following. The method may include detecting and removing at least one reflection from consideration as a difference between the control image and the process image. The removing at least one reflection from consideration as a difference between the control image and the process image may include capturing at least one image of the aircraft under quality inspection from a first perspective and capturing at least one image of the aircraft under quality inspection from a second perspective. The removing at least one reflection from consideration as a difference between the control image and the process image may include placing at least one standardized marker on the aircraft under quality inspection prior to the capturing at least one image of the aircraft under quality inspection from a first perspective and the capturing at least one image of the aircraft under quality inspection from a second perspective. The method may include remediating an anomaly corresponding to the at least one difference. The detecting a plurality of features may include detecting a plurality of features using a Speeded Up Robust Features (SURF) algorithm. The registering the control image with the process image may be performed using a RANdom SAmple Consensus (RANSAC) algorithm. The generating an output image may include combining at least a portion of an image taken from a first perspective with at least a portion of an image taken from a second perspective different from the first perspective. The control image may include a combination of a first control image taken from a first perspective and a second control image taken from a second perspective different from the first perspective, and the process image may include a combination of a first process image taken from a third perspective and a second process image taken from a fourth perspective different from the third perspective. The detecting at least one difference may include performing a pixel-by-pixel comparison between the control image and the process image.

According to various embodiments, a system for automated aircraft paint application quality inspection is presented. The system includes electronic persistent storage storing a control image depicting at least a portion of aircraft paint application for the aircraft under quality inspection; a plurality of cameras disposed to capture multiple images of the aircraft under quality inspection; and at least one electronic processor, communicatively coupled to the electronic persistent memory and the plurality of cameras, that executes instructions to perform operations comprising: retrieving from the electronic persistent storage the control image; capturing, by the plurality of cameras, a process image depicting at least a portion of aircraft paint application on the aircraft under quality inspection; detecting a plurality of features in the control image and the process image; registering the control image with the process image; detecting at least one difference between the control image and the process image; generating an output image, wherein the output image comprises a depiction of the aircraft under quality inspection with the at least one difference annotated; and causing the output image to be displayed.

Various optional features of the above embodiments include the following. The operations may further include detecting and removing at least one reflection from consideration as a difference between the control image and the process image. The removing at least one reflection from consideration as a difference between the control image and the process image may include capturing, by the plurality of cameras, at least one image of the aircraft under quality inspection from a first perspective and capturing, by the plurality of cameras, at least one image of the aircraft under quality inspection from a second perspective. The system may include at least one standardized marker configured to be placed on the aircraft under quality inspection prior to the capturing at least one image of the aircraft under quality inspection from a first perspective and the capturing at least one image of the aircraft under quality inspection from a second perspective. The operations may further include directing a user to remediate an anomaly corresponding to the at least one difference. The detecting a plurality of features may include detecting a plurality of features using a Speeded Up Robust Features (SURF) algorithm. The registering the control image with the process image may be performed using a RANdom SAmple Consensus (RANSAC) algorithm. The generating an output image may include combining at least a portion of an image taken from a first perspective with at least a portion of an image taken from a second perspective different from the first perspective. The control image may include a combination of a first control image taken from a first perspective and a second control image taken from a second perspective different from the first perspective, and the process image may include a combination of a first process image taken from a third perspective and a second process image taken from a fourth perspective different from the third perspective. The detecting at least one difference may include performing a pixel-by-pixel comparison between the control image and the process image.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

In general, some embodiments provide computerized in-process quality inspection of a structure's surface (e.g., an aircraft during final assembly). More particularly, some embodiments provide automated quality inspection of aircraft paint application (e.g., livery) where automated image processing aligns machine-vision features of captured images of aircraft under inspection with corresponding features in control (reference) images and uses the alignment to identify potential defects (e.g., mislocated livery features, missing livery features, discolored imagery, foreign object debris, stencils and other paint application expedients that should have been removed, etc.). Embodiments may subsequently display an augmented reality depiction of the aircraft under inspection, where such potential defects are highlighted or otherwise annotated. Some embodiments include wearable augmented reality head hardware to accomplish such display. Embodiments may account for reflections from painted or unpainted surfaces, the relative quality of ambient lighting, and a range of possible livery colors. Embodiments may include an electronic persistent storage library of control images for feature identification and comparison.

Some embodiments use a plurality of standoff cameras that move, or are positioned at varying angles, so as to allow for automated identification of reflections in captured images. Such cameras allow some embodiments to differentiate reflections and shadows from livery and skin features, and ignore the former in the quality analysis.

Example embodiments are described presently in reference to the included figures.

Figure 1:
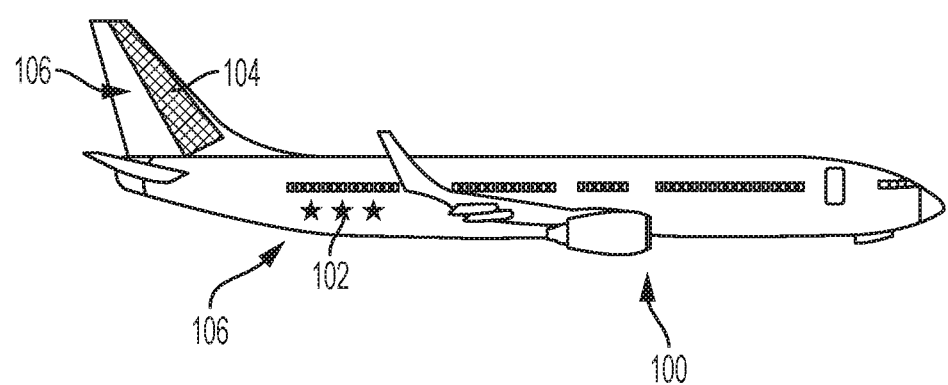
FIG. 1 is an image of aircraft livery on an aircraft according to some embodiments.

FIG. 1 is an image of aircraft livery 106 on aircraft 100 according to some embodiments. In general, aircraft may have images in multiple locations in multiple colors. Aircraft 100 as depicted includes a portion of aircraft livery 102 (a series of stars) and a portion of aircraft livery 104 (shading on the tail fin). The various images, insignia, and alphanumeric text on particular aircraft may be referred to herein as the aircraft's "livery". In general, aircraft livery may signify airline, aircraft manufacturer, governmental licensing, and various other required, optional, and/or trademarked insignia. Aircraft livery may be applied using one or more stencils, for example.

Figure 2:
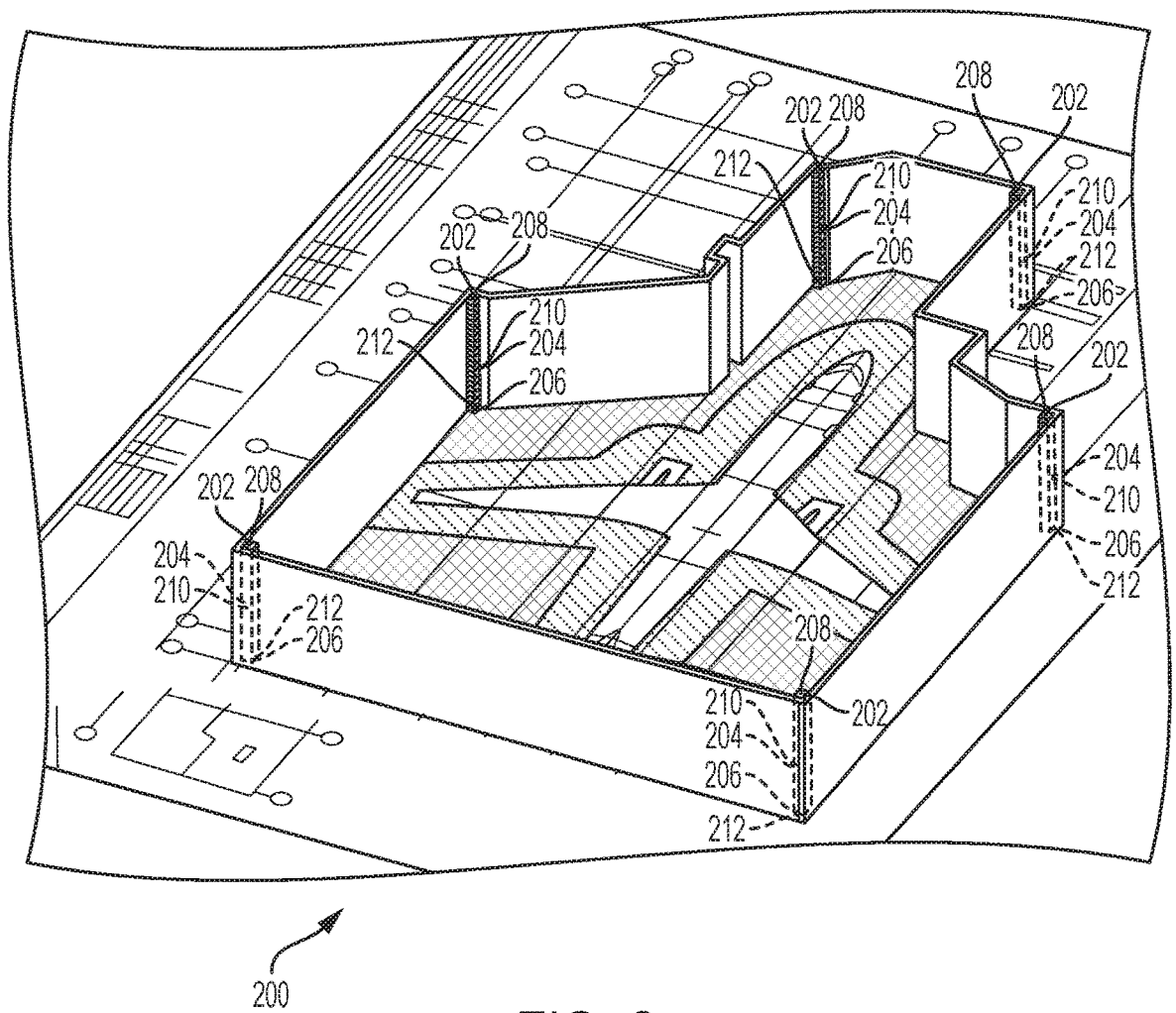
FIG. 2 is a schematic diagram of an image capture apparatus according to some embodiments.

FIG. 2 is a schematic diagram of an image capture apparatus 200 according to some embodiments. In general, embodiments may be implemented at a location where aircraft livery are applied to aircraft. Thus, embodiments may be implemented at a main factory or paint hangar, or a location where expertise on paint quality may be limited, such as remote or offload paint facilities. Further, embodiments may include hardware and processing techniques that account for reflections, shadows, and other visible phenomena (see FIG. 3) that do not represent physical material actually present on the surface of the aircraft. Such embodiments may exclude such phenomena from the automated processing that is otherwise applied to livery and other surface features and detritus, such that they are ignored for purposes of automated quality inspection.

Image capture apparatus includes a plurality of cameras 202, 204, 206 positioned so as to capture images of an aircraft under quality inspection from perspectives 208, 210, and 212, respectively. As disclosed herein, some embodiments capture images of an aircraft from multiple angles and/or positions so as to be able to detect reflections, shadows, and other transient visual phenomena (see FIG. 3). Cameras 202, 204, 206 may be situated on rails or other structure that permits them to change positions so as to capture images of substantially the same area of the aircraft from multiple angles. Such movable cameras may be automatically movable, e.g., by way of motors configured to shift their positions along sets of rails. The rails may be vertical and/or horizontal. For embodiments that include movable cameras, cameras 202 may suffice, without cameras 204 and 206, because cameras 202 may be moved to capture images from any of perspectives 208, 210, or 212. Further, for embodiments that include movable cameras, such cameras may be relatively low definition, because such movable cameras may zoom in so that their field of view is trained on the relevant aircraft portion. For embodiments that include static cameras, cameras 202, 204, 206 may be high definition, because image portions may be extracted and separately processed. Details of such processing, and the processing used to exclude transient visual phenomena from consideration as potential paint application defects, are presented herein, e.g., in reference to FIG. 10, below. Six sets of two or more cameras (or six movable cameras) may be used, so as to capture each of six sections of an aircraft from multiple perspectives. Note, however, that six camera sets is exemplary; in other embodiments, the number of cameras may be decided on a case-by-case basis, based on the size of both the hangar and the aircraft.

Figure 3:
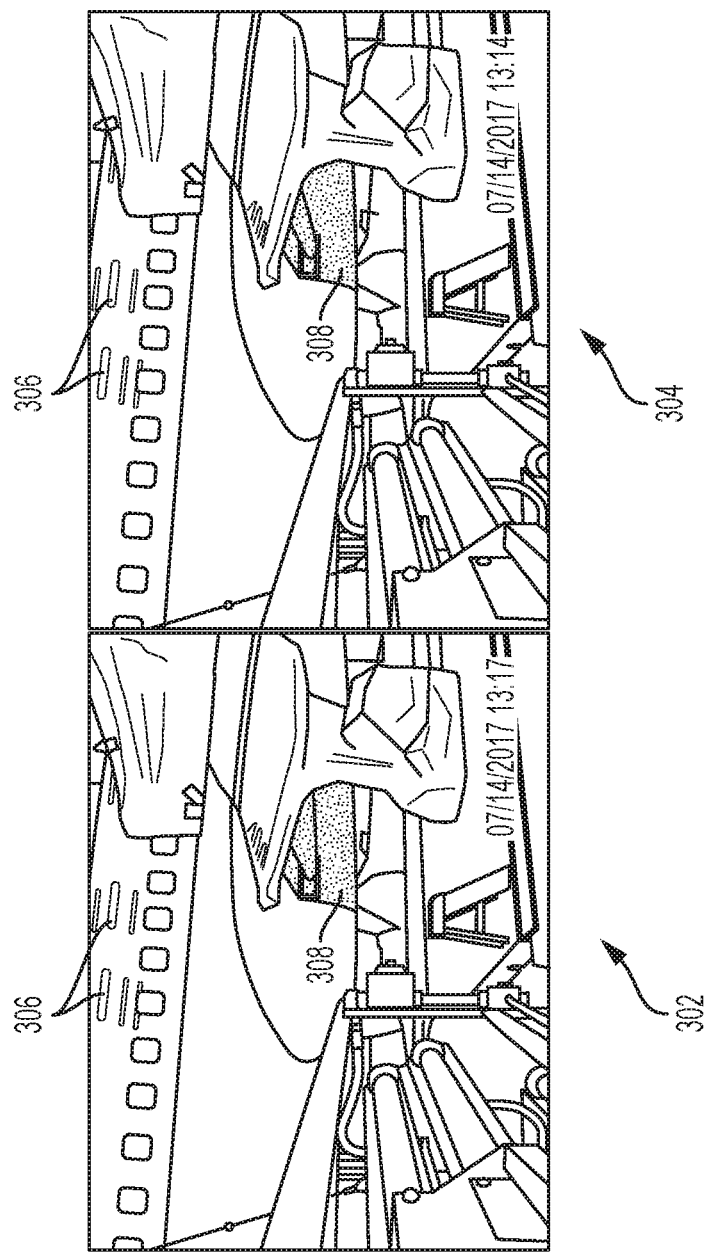
FIG. 3 depicts a control image and a process image of an aircraft according to some embodiments.

FIG. 3 depicts a control image 302 and a process image 304 of an aircraft according to some embodiments. Both control image 302 and process image 304 may be captured using image capture apparatus 200 of FIG. 2, for example, although such capture may occur at different stages of the overall aircraft paint quality inspection process disclosed herein for control image 302 and a process image 304. Control image 302 and other control images serve as reference images for purposes of automated computer vision comparison to newly captured images, such as process image 304, taken of aircraft during the quality inspection process. Control image 302 and similar control images may be stored in persistent electronic storage, such as electronic persistent storage 1112 of system 1100 as shown and described below in reference to FIG. 11. Note that both control image 302 and process image 304 show reflections 306 and shadows 308.

Figure 4:
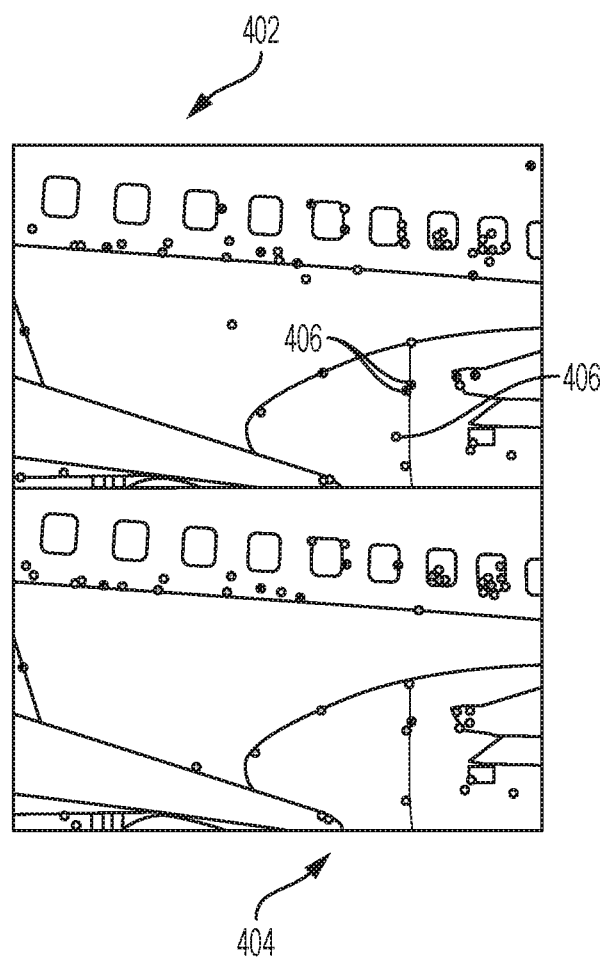
FIG. 4 depicts feature detection in a control image and a process image according to some embodiments.

FIG. 4 depicts feature detection in a control image 302 and a process image 304 according to some embodiments. The feature detection used according to some embodiments may be automated feature detection that utilizes computer vision techniques. Suitable techniques include Speeded Up Robust Features ("SURF"), e.g., as disclosed in U.S. Published Application No. 2009/0238460, the contents of which are hereby incorporated by reference. Such techniques identify visually apparent features in electronic images, such as features 406 in control image 402. (Note that features corresponding to features 406 appear in process image 404.) Such techniques may be applied independently to control images and process images as disclosed herein, e.g., in reference to FIGS. 9 and 10.

Figure 5:
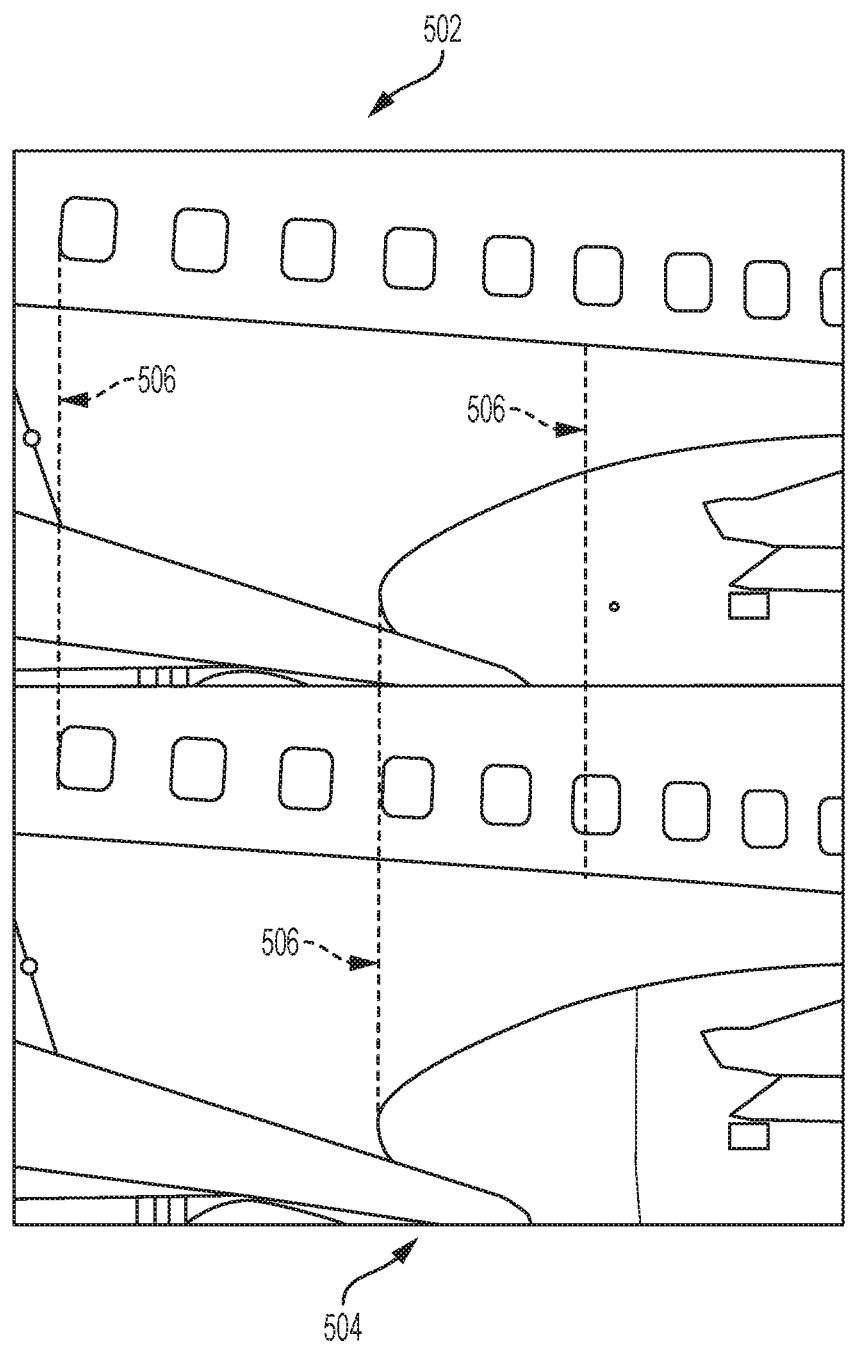
FIG. 5 depicts feature matching according to some embodiments.

FIG. 5 depicts feature matching according to some embodiments. In general, disclosed embodiments may match features detected in a control image with features detected in a corresponding process image using automated computer vision techniques. FIG. 5 depicts control image 502 and process image 504, along with lead lines 506 connecting three example features in control image 502 to corresponding features in process image 504. In general, RANdom SAmple Consensus ("RANSAC") may be used to match features between control and process images according to various embodiments. RANSAC is particularly suitable for embodiments because it is robust in the presence of data provided by error-prone feature detectors. RANSAC may be used by embodiments to register control images to process images as described herein. Further usage of RANSAC according to some embodiments is shown and described below in reference to FIGS. 8, 9, 10, and 11.

Figure 6:
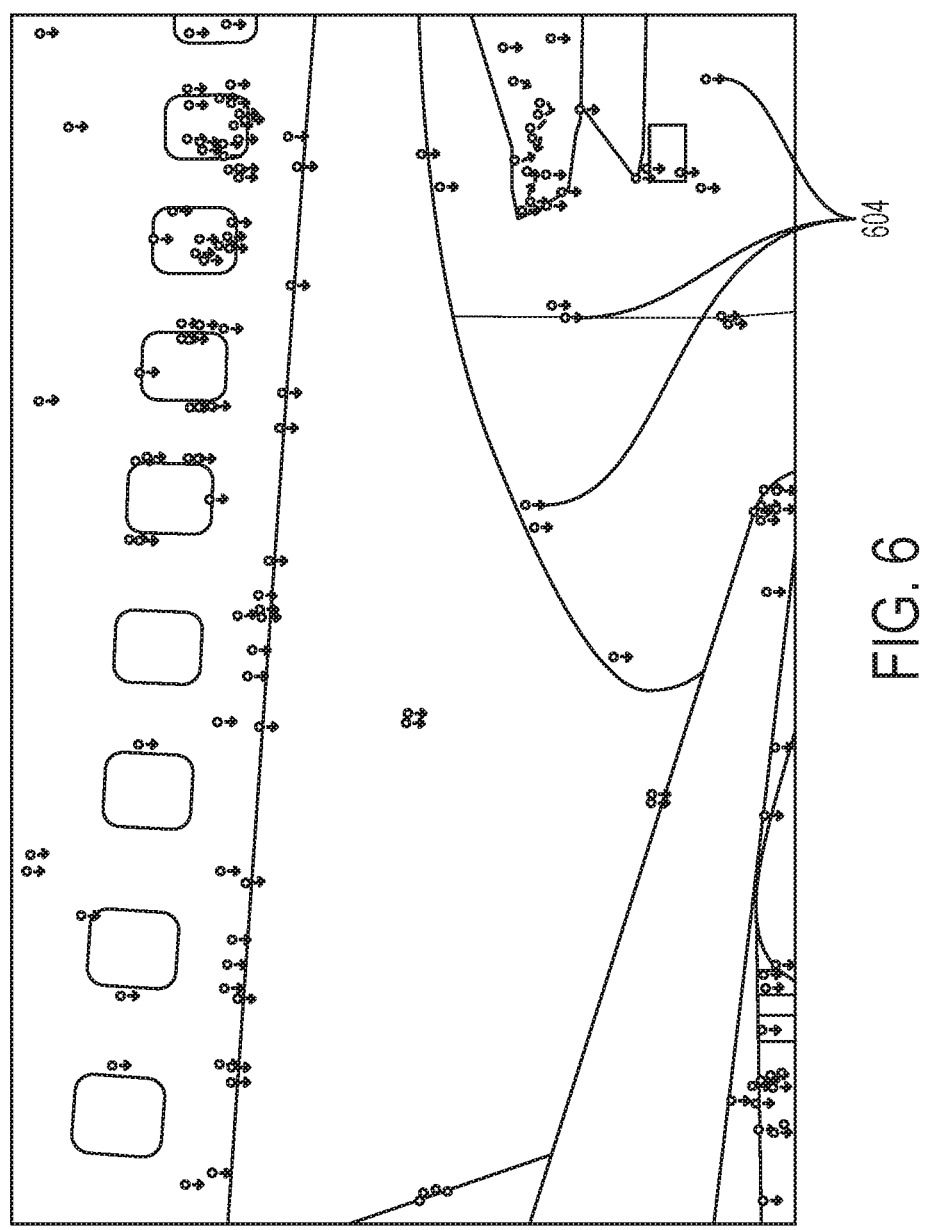
FIG. 6 depicts feature displacement vectors according to some embodiments.

FIG. 6 depicts feature displacement vectors 604 according to some embodiments. In registering control images to process images based on matching detected features, embodiments may utilize RANSAC. RANSAC has as a user-settable parameter a maximum local displacement value. Such a value determines the maximum local displacement between features in a control image and a process image for the features to be considered as corresponding. Beyond the maximum local displacement value, features will not be determined as matching by RANSAC. As depicted in FIG. 6, features in a combined image are determined to be corresponding by an application of RANSAC because although they are not precisely co-located, they are within a user-set maximum local displacement value. Displacement vectors 604 depict the positional differences.

Figure 7:
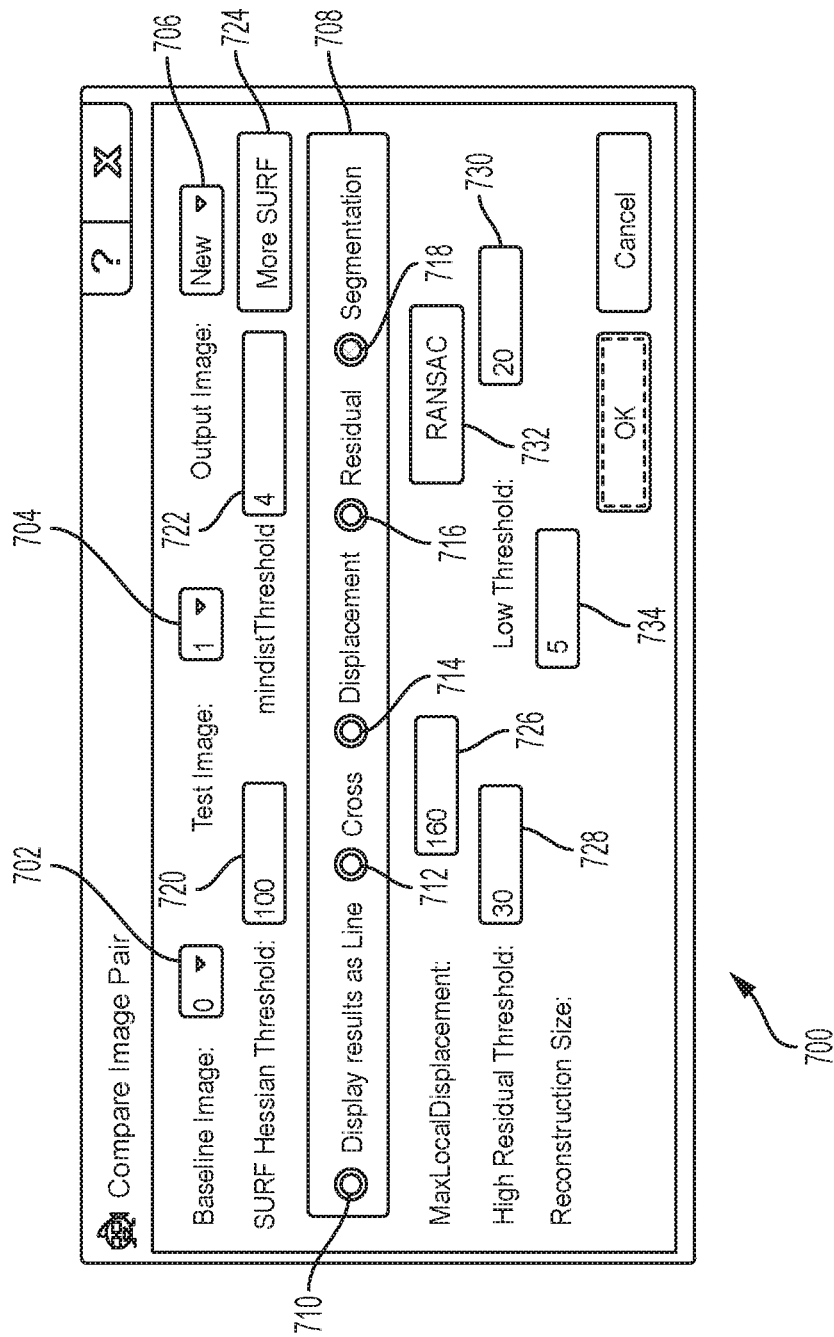
FIG. 7 depicts a graphical user interface according to some embodiments.

FIG. 7 depicts a graphical user interface 700 according to some embodiments. Graphical user interface 700 may be used by a user to set user-selectable values for various parameters used by embodiments. Some embodiments utilize graphical user interface to set user-selectable SURF and RANSAC parameters, among other values.

Thus, graphical user interface 700 includes a field for a user to select one or more control (baseline) images 702, a field for a user to select one or more process images 704, and a field for a user to select a file name for an output image 706. The selected control and process image(s) are processed by embodiments as disclosed, to produce an output image, which is saved according to the user-selected file name. Graphical user interface 700 also has a set of radio buttons 708 for selecting how any detected difference between a control image and a process image that represents a potential defect may be displayed. Thus, graphical user interface 700 includes a radio buttons for highlighting detected differences using lines 710, a radio buttons for highlighting detected differences using crosses 712, a radio buttons for highlighting detected differences using displacement vectors 714, a radio buttons for highlighting detected differences using residuals 716, or a radio buttons for highlighting detected differences using segmentations 718. Selecting the radio buttons for highlighting detected differences using lines 710 results in the output image displaying feature points and corresponding lines. Selecting the radio buttons for highlighting detected differences using crosses 712 results in the output image depicting each feature point as a different color cross. Selecting the radio buttons for highlighting detected differences using displacement 714 results in the output image displaying feature points and corresponding displacement vectors. That is, the displacement setting causes the output image to depict how locations of the feature points differ between the control image(s) and the process image(s). Selecting the radio buttons for highlighting detected differences using residual 716 causes the output image to display differences in intensity between the different images after registration between the images. The residual setting is particularly useful for highlighting foreign objects in the process image(s). Selecting the radio buttons for highlighting detected differences using segmentation 718 setting masks any foreign object in the output image. The segmentation setting is particularly useful for highlighting where the images differ.

Graphical user interface 700 includes fields by which a user may select SURF parameter values. In particular, graphical user interface 700 includes a field for a SURF Hessian threshold parameter 720 that a user may set. This parameter is for computing feature points, with a default value of 100. If more feature points for the purpose of registering images are desired, then this value may be increased. However, a higher value can result in more corner points and more noise. Graphical user interface 700 also includes a field for a SURF minimum distance parameter 722 that a user may set. When SURF compares two points, this value may be increased to require a closer match. Graphical user interface 700 also includes a SURF virtual button 724 which, when activated, causes a SURF parameter pop-up to be displayed. The SURF parameter pop-up includes additional fields for user-settable SURF parameter values.

Graphical user interface 700 also includes fields by which a user may select RANSAC parameter values. Thus, graphical user interface 700 includes a "MaxLocalDisplacement" field 726 into which a maximum local displacement value may be entered. The maximum local displacement value controls the size of the region that the RANSAC algorithm will search in its attempts to find matching features. This value selects the maximum number of pixels that a feature point may be displaced between images being registered and still be considered as matching. Graphical user interface 700 also includes a "High Residual Threshold" field 728 into which a user may enter a value that controls the difference in intensity between the two compared images that may still be considered as matching. High values for this parameter result in more matches, but may not fully capture shape information. Graphical user interface 700 also includes a field for a "Low Threshold" value 730. This parameter, in combination with the High Residual threshold value, determine how much difference between images is tolerated while still permitting a conclusion of match. Graphical user interface 700 also includes a RANSAC virtual button 732 which, when activated, causes a RANSAC parameter pop-up to be displayed. The RANSAC parameter pop-up includes additional fields for user-settable RANSAC parameter values. Graphical user interface 700 also includes a reconstruction size field 734 for entering a user-selectable reconstruction size value. This value determines the pixel radius from detected differences from which small objects and noise may be removed when generating the output image.

Figure 8:
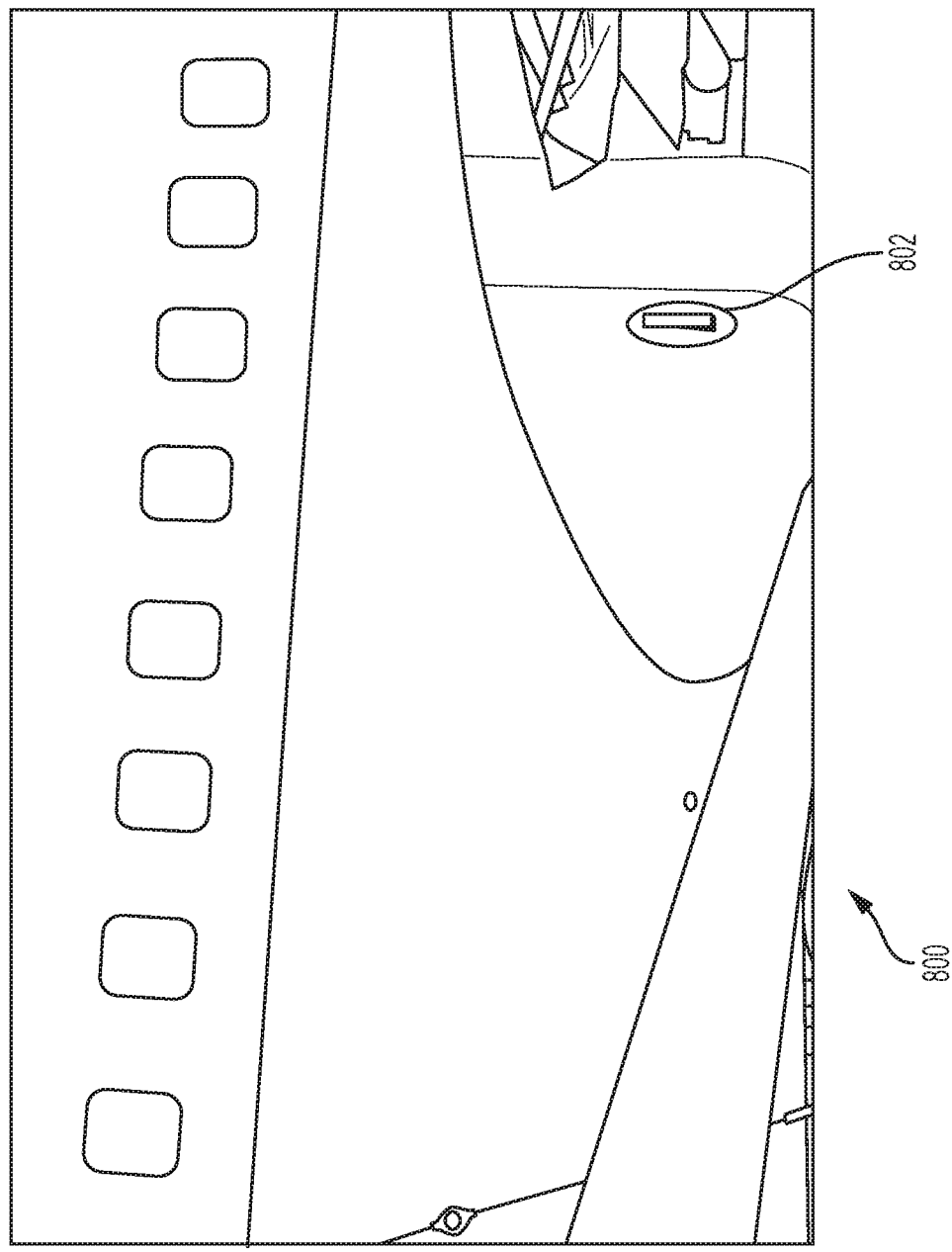
FIG. 8 depicts an example output image according to some embodiments.

FIG. 8 depicts an example output image 800 according to some embodiments. In particular, embodiments may output an output image such as output image 800, e.g., for display to a user. The output image highlights or otherwise annotates a combined image that includes data from multiple angles and possibly from both process images and control images. As shown output image 800 includes an oval-shaped annotation 802 highlighting a residual fragment of tape that was present on an aircraft undergoing quality inspection. Because a corresponding tape fragment did not appear in the corresponding control image(s), embodiments detect and annotate the fragment in an output image. A user may take subsequent steps to remediate the potential defect, such as removing any foreign material, applying missing paint, or removing and relocating misplaced paint application.

Figure 9:
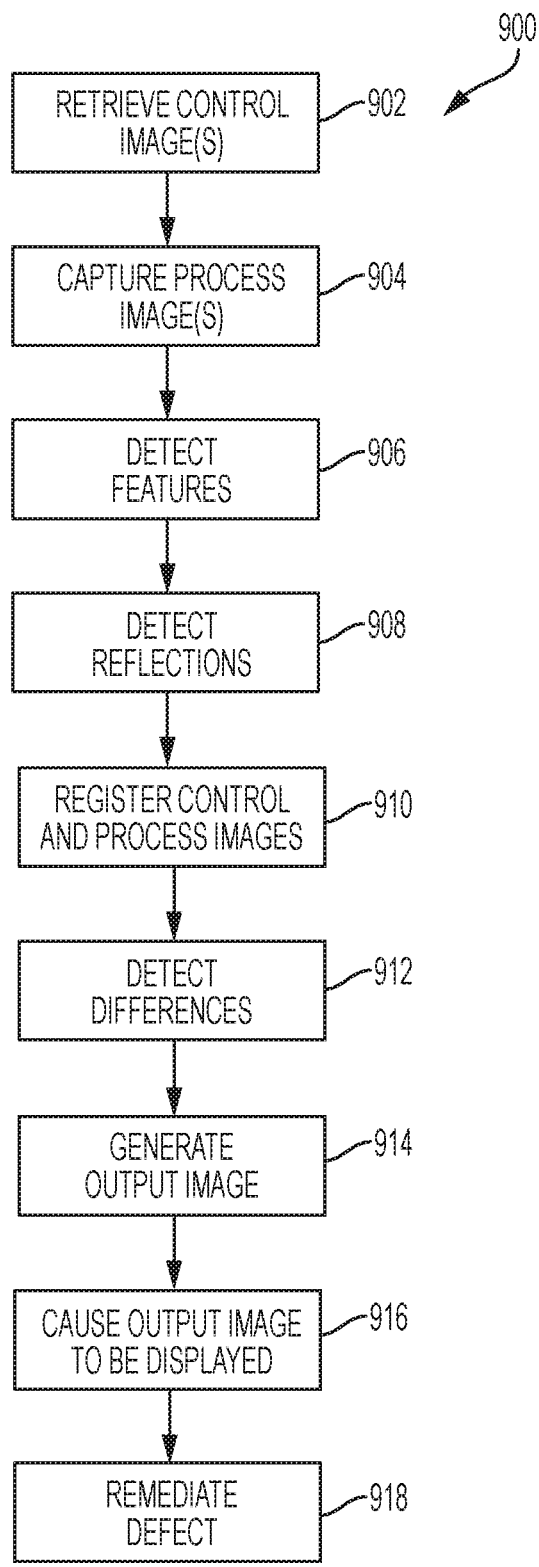
FIG. 9 is a flow diagram of an aircraft paint application quality inspection method according to some embodiments.

FIG. 9 is a flow diagram of an aircraft paint application quality inspection method 900 according to some embodiments. Method 900 may utilize hardware and techniques as shown and described above in reference to FIGS. 2-8. Method 900 may be implemented using the system shown and described below in reference to FIG. 11.

Figure 11:
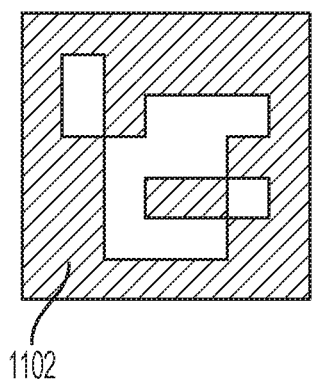
FIG. 11 is a diagram of a standardized marker according to some embodiments.

At block 902, method 900 retrieves one or more control images for electronic persistent storage, e.g., persistent storage 1112 of FIG. 11. Such retrieval may be over an electronic computer network, for example. The control images may have been originally acquired using apparatus 200 of FIG. 2, for example. Thus, the control images may include images taken from multiple perspectives of substantially the same portions of an aircraft. Multiple aircraft portions, each with multiple perspectives, may be represented in the control images. The represented aircraft portions and perspectives may encompass all livery and other paint application for the aircraft. The captured control images may be stored and indexed according to aircraft location and perspective.

At block 904, method 900 captures one or more process images of an aircraft undergoing quality inspection. The process images may be captured using apparatus 200 of FIG. 2, for example. Thus, the process images may include images taken from multiple perspectives of substantially the same portions of the aircraft undergoing quality inspection. Multiple aircraft portions, each with multiple perspectives, may be represented in the process images. The process images may correspond to the control images in the sense that each process image has a corresponding control image that was acquired of substantially the same aircraft portion and from substantially the same perspective.

At block 906, method 900 detects features in the process images. Note that the actions of this block may be performed on the control images as well. In particular, the actions of this block may be performed on the control images at any point prior to the actions of block 910. Method 900 may detect features using an implementation of SURF as shown and described above in reference to FIGS. 4 and 7, above.

At block 908, method 900 detects reflections, shadows, and other transient visual phenomena in the process images. Note that the actions of this block may be performed on the control images as well. In particular, the actions of this block may be performed on the control images at any point prior to the actions of block 912. The actions of this block are described in detail below in reference to FIG. 10.

At block 910, method 900 registers the process image to the control image. The actions of this block may utilize a RANSAC implementation, as shown and described above in reference to FIGS. 4-7, for example. Note that the actions of block 908 may result in some of the control images being merged into a merged control image and/or some of the process images being merged into merged process images. Such merged images may include the union of detected features, for example. In such instances, the actions of this block may be applied to register the merged control image(s) with the merged process image(s).

At block 912, method 900 detects differences between the registered process image and control image of block 910. The detection may proceed by comparing the images pixel-by-pixel and recording any differences that exceed a threshold. The detection may utilize a mathematical affine transformation (that is, a mathematical linear transformation that preserves points, straight line, and planes) between the control image and process image that was used for registration. The detection may ignore any pixels identified as representing reflections or other transient visual phenomena, as described below in reference to FIG. 10. That is, the difference detection process may omit any pixels identified as reflections (or other transient visual phenomena) from the pixel-by-pixel comparison. In this manner, some embodiments are capable of automatically detecting potential aircraft livery defects while disregarding transient visual features that do not represent paint or other physical anomalies.

At block 914, method 900 generates an output image representing any differences detected at block 912. In particular, the action of this block can include rendering a highlight or other annotation (e.g., a circular, oval, rectangular, or square marking about any detected difference). An example suitable output image is presented above in FIG. 8.

At block 916, method 900 causes the output image to be displayed. The actions of this block may take any of a variety of forms. According to some embodiments, the output image is displayed on a computer monitor. According to some embodiments, the output image is displayed in a virtual reality headset. According to some embodiments, the output image may be output to electronic persistent memory or to a user via an electronic computer network, for example.

At block 918, method 900 includes a user remediating any detected differences. The actions of this block may include a user removing any foreign materials from the aircraft, applying any omitted livery or other paint application, removing any improper livery or other paint application, or removing and replacing any misplaced livery or other paint application. The actions of this block are dependent upon, and guided by, the output image of blocks 914 and 916.

Figure 10:
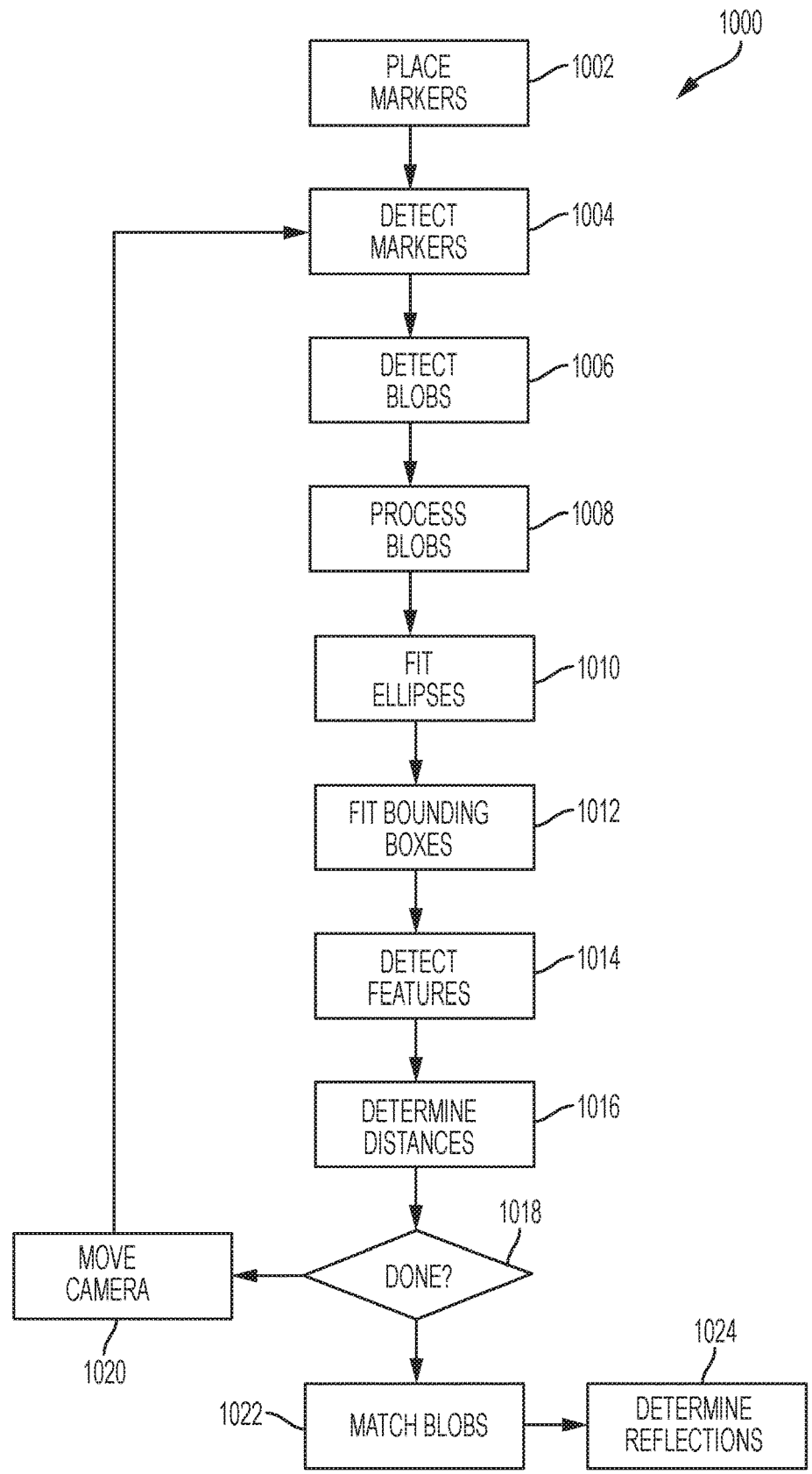
FIG. 10 is a flow diagram of a reflection handling method according to some embodiments.

FIG. 10 is a flow diagram of a reflection handling method 1000 according to some embodiments. Method 1000 may be implemented to perform the actions of block 908 of method 900 of FIG. 9 on one or more process images. Further, method 1000 may be applied to one or more control images described in reference to FIG. 9 at any point prior to the action of block 912 of method 900. Because method 1000 may be applied to both control images and process images, the following description of method 1000 refers to a generic "image" or "image under operation", with the understanding that such image may be either a control image or a process image. Method 1000 may utilize hardware and techniques as shown and described above in reference to FIGS. 2-8. Method 1000 may be implemented using the system shown and described below in reference to FIG. 11.

At block 1002, method 1000 places standardized markers on the aircraft. To perform the actions of this block, a user may generate markers from a known dictionary and dimension, print them to scale, and attach them to the aircraft at locations such that they are visible by at least one camera and do not hinder workers. Markers may be one foot by one foot, for example. Suitable markers are ArUco markers, which are square and include a wide black border that facilitates fast detection in an image, as well as an inner matrix that can code information. The actions of this and the next block permit computer vision techniques to be applied in method 1000.

At block 1004, method 1000 detects the markers positioned per block 1002 in an image. For applications of method 1000 to block 908 of method 900, the image in which the markers are detected may be the process image captured per block 904 of method 900. For applications of method 1000 to the control images used in method 900, the image in which the markers are detected may be captured at any suitable time, e.g., at a time immediately after when the control images are captured. Method 1000 may use the dictionary that was used to generate the markers to detect the marker in the image, detect the corners of the markers, and get the coordinates of the corners. Such coordinates may be expressed as memory addresses for the corresponding pixel locations.

At block 1006, method 1000 detects blobs in the image. Any suitable blob detection technique, such as RANSAC, may be used. Embodiments may limit blob detection to detecting blobs that are roughly elliptical in shape, or, more generally, roughly conic section in shape. Such limitation enhances efficiency of the process and takes advantage of the overall tubular shape of most aircraft. In general, reflections on tubular surfaces resemble ellipses or other conic sections.

At block 1008, method 1000 processes the image in various ways to enhance the detected blobs. Some embodiments use adaptive thresholding in a known manner to obtain a binary image. Such embodiments may identify the outline of each blob using known techniques and utilize as a working image a conversion of the image under operation to a black-and-white version. Some embodiments may massage the image under operation using the known techniques of erosion and dilation. Such embodiments operate to close the blob boundaries using known techniques. Some embodiments submit the image to contour detection. Such embodiments identify a boundary contour of each blob using such techniques. These and other processing steps may be applied by various embodiments.

At block 1010, method 1000 fits ellipses to the detected and processed blobs. The actions of this block can include fitting ellipses to the identified boundary contours of the blobs. The actions of this block may include checking for the fit of the ellipses. Blobs that adequately fit ellipses are tracked as candidates for reflections. Thus, at this block, method 1000 keeps the contours that are roughly elliptical, as these ellipses mark the blobs corresponding to potential reflections.

At block 1012, method 1000 fits a bounding box to each reflection candidate. Such boxes better define the location of the reflection candidates, e.g., because their corners are well defined. Further, bounding boxes can correct for imperfect contour determinations.

At block 1014, method 1000 detects features in the image. The feature detection may be limited to detecting features on and within the reflection candidates. Suitable techniques include SURF, as shown and described above in reference to FIGS. 4-7.

At block 1016, method 1000 determines distances from the bounding boxes (e.g., the corners thereof) to the standardized markers (e.g., the corners thereof). These distances are stored in memory for later comparison to similar distances computed using images taken from different perspectives.

At block 1018, method 1000 determines whether to repeat the actions of blocks 1004, 1006, 1008, 1010, 1012, 1014, and 1016 after moving the cameras (or using different cameras). The determination is based on whether method 1000 has captured multiple images of substantially the same portions of the aircraft but from different perspectives. At least two perspectives are used for the reflection detection process, so some embodiments may proceed to block 1020 unless there are at least two such images for each portion of the aircraft under quality inspection. Some embodiments utilize more than two such images for each aircraft portion under inspection. If block 1018 determines that additional images are needed, then control passes to block 1020. Otherwise, control passes to block 1022.

At block 1020, method 1000 moves the cameras (e.g., cameras 202 of apparatus 200 of FIG. 2) or uses cameras that are situated differently from the cameras that were used in the previous iteration. Such cameras capture images of the aircraft from different perspectives. After block 1020, control passes to block 1004.

At block 1022, method 1000 matches blobs detected in the same general aircraft portion among the images captured from a plurality of perspectives. The features detected per block 1014 may be used to that end. A matching process, such as RANSAC, as shown and described above in reference to FIGS. 4-7, may be used to perform the matching. After this block, each blob, together with any other blobs determined to match to, it are referred to as a "matching blob set".

At block 1024, method 1000 determines the blobs that are to be processed as reflections, or other transient visual phenomena, in the images. In general, after capturing one image from angle "a" and another one from angle "b", if a feature moves (e.g., is displaced, changed contrast, or disappeared) then it is processed as a reflection, because reflections change with the changing angle of the light source or position of the surface). If the feature did not change positions, then it is processed normally with the rest of the image. Thus, at this block, method 1000 compares the distances determined at block 1016 for the various blobs within each matching blob set. In other words, if the distance from a particular ArUco marker to each blob in a matching blob set differs among the various image perspectives, then the blob is subsequently processed as a reflection or other transient visual phenomena. If the distance from a particular ArUco marker to each blob in a matching blob set is the same among the various image perspectives, then the blob is subsequently processed as the remainder of the image.

FIG. 11 is a diagram of a standardized marker 1102 according to some embodiments. As shown, standardized marker is an example of an ArUco marker that encodes the numeral "123". However, various embodiments may use standard markers that have any of a variety of encoded data.

Figure 12:
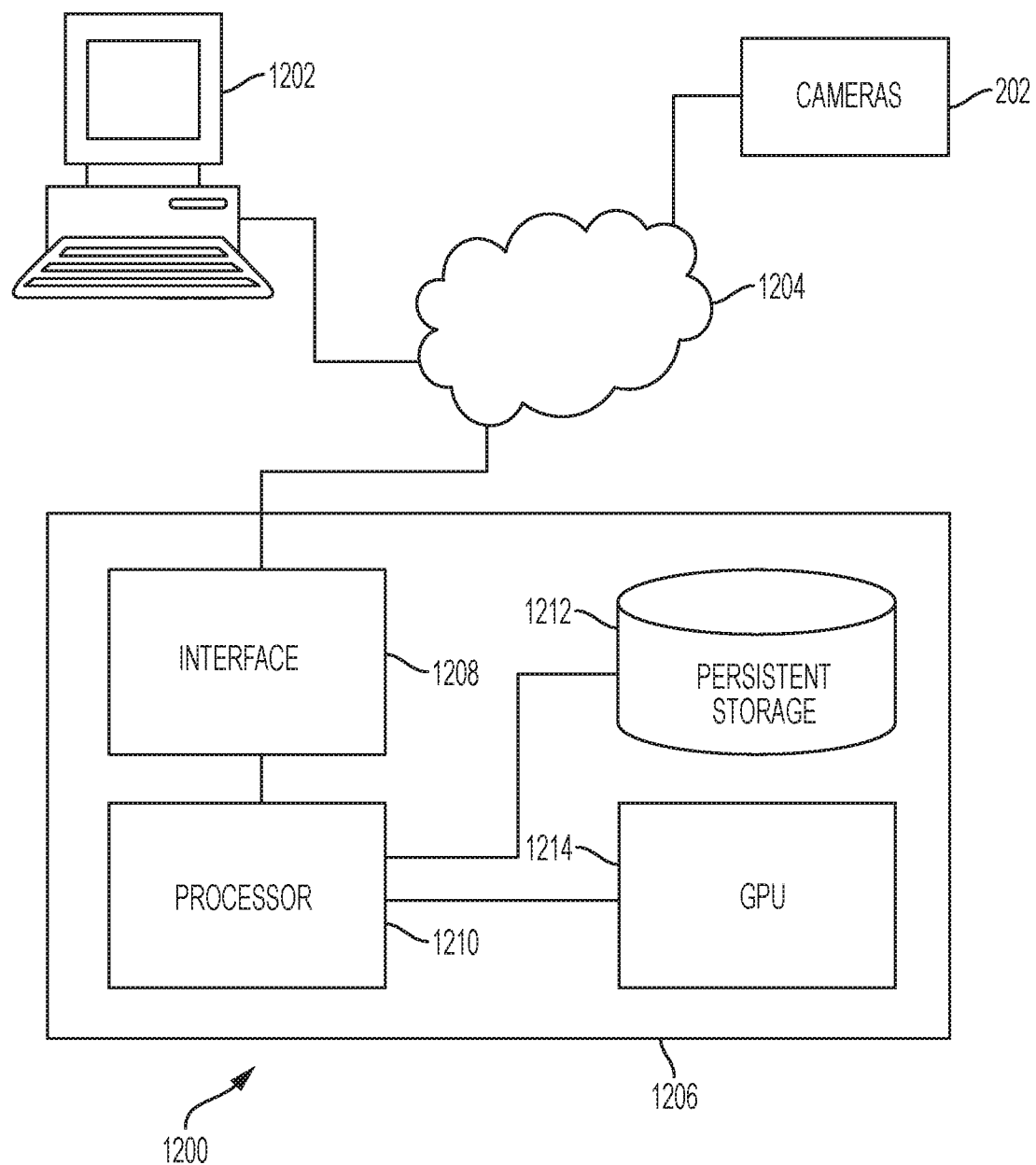
FIG. 12 is a schematic diagram of a system according to some embodiments.

FIG. 12 is a schematic diagram of a system 1200 suitable for implementation of a method as shown and described, e.g., methods 900 and 1000. System 1200 may be based around an electronic hardware internet server computer 1206 that includes one or more electronic processors 1210, which may be communicatively coupled to the internet 1204. System 1200 includes network interface 1208 to affect the communicative coupling to the internet 1204, and, through internet 1204, client computer 1202 and cameras 202 (see FIG. 2 and accompanying description). Network interface 1208 may include a physical network interface, such as a network adapter. System 1200 may be a special-purpose computer, adapted for reliability and high-bandwidth communications. Thus, system 1200 may be embodied in a cluster of individual hardware server computers, for example. Processors 1210 may be multi-core processors suitable for handling large amounts of information. Processors 1210 are communicatively coupled to persistent storage 1212, and may execute instructions stored thereon to effectuate the techniques disclosed herein on concert with client computer 1202 as shown and described in reference to FIGS. 9 and 10 in particular. Persistent storage 1212 may be in a Redundant Array of Inexpensive Disk drives (RAID) configuration for added reliability. Processors 1210 are also communicatively coupled to graphical co-processors (GPU) 1214. Graphical co-processors may expedite the technique disclosed herein by performing operations in parallel.

Note that some embodiments support any remote inspection of features of a surface of a three-dimensional structure, not limited to aircraft.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of automated aircraft paint application quality inspection, the method comprising:
   retrieving from electronic persistent storage a control image depicting at least a portion of aircraft paint application for an aircraft under quality inspection;
   placing at least one standardized marker on the aircraft under quality inspection;
   capturing a process image depicting at least the portion of aircraft paint application on the aircraft under quality inspection;
   capturing at least a first perspective image of at least the portion of the aircraft paint application under quality inspection from a first perspective and capturing at least a second perspective image of at least the portion of the aircraft paint application under quality inspection from a second perspective different from the first perspective;
   detecting and removing at least one reflection from consideration as a difference between the control image and the process image by detecting different distances between the at least one standardized marker and candidate blobs in the first perspective image and the second perspective image;
   detecting a plurality of features in the control image and the process image;
   registering the control image with the process image;
   detecting at least one difference between the control image and the process image;
   generating an output image, wherein the output image comprises a depiction of the aircraft under quality inspection with the at least one difference annotated; and
   causing the output image to be displayed.

2. The method of claim 1, further comprising remediating an anomaly corresponding to the at least one difference.

3. The method of claim 1, wherein the detecting a plurality of features comprises detecting a plurality of features using a Speeded Up Robust Features (SURF) algorithm.

4. The method of claim 1, wherein the registering the control image with the process image is performed using a RANdom SAmple Consensus (RANSAC) algorithm.

5. The method of claim 1, wherein the generating an output image comprises combining at least a portion of an image taken from a first perspective with at least a portion of an image taken from a second perspective different from the first perspective.

6. The method of claim 1, wherein the control image comprises a combination of a first control image taken from a first perspective and a second control image taken from a second perspective different from the first perspective, and wherein the process image comprises a combination of a first process image taken from a third perspective and a second process image taken from a fourth perspective different from the third perspective.

7. The method of claim 1, wherein the detecting at least one difference comprises performing a pixel-by-pixel comparison between the control image and the process image.

8. A system for automated aircraft paint application quality inspection, the system comprising:

electronic persistent storage storing a control image depicting at least a portion of aircraft paint application for the aircraft under quality inspection;

a plurality of cameras disposed to capture multiple images of the aircraft under quality inspection; and at least one electronic processor, communicatively coupled to the electronic persistent memory and the plurality of cameras, that executes instructions to perform operations comprising:

retrieving from the electronic persistent storage the control image;

placing at least one standardized marker on the aircraft under quality inspection;

capturing, by the plurality of cameras, a process image depicting at least a portion of aircraft paint application on the aircraft under quality inspection;

capturing at least a first perspective image of at least the portion of the aircraft paint application under quality inspection from a first perspective and capturing at least a second perspective image of at least the portion of the aircraft paint application under quality inspection from a second perspective different from the first perspective;

detecting and removing at least one reflection from consideration as a difference between the control image and the process image by detecting different distances between the at least one standardized marker and candidate blobs in the first perspective image and the second perspective image;

detecting a plurality of features in the control image and the process image;

registering the control image with the process image;

detecting at least one difference between the control image and the process image;

generating an output image, wherein the output image comprises a depiction of the aircraft under quality inspection with the at least one difference annotated; and causing the output image to be displayed.

9. The system of claim 8, wherein the operations further comprise directing a user to remediate an anomaly corresponding to the at least one difference.

10. The system of claim 8, wherein the detecting a plurality of features comprises detecting a plurality of features using a Speeded Up Robust Features (SURF) algorithm.

11. The system of claim 8, wherein the registering the control image with the process image is performed using a RANdom SAmple Consensus (RANSAC) algorithm.

12. The system of claim 8, wherein the generating an output image comprises combining at least a portion of an image taken from a first perspective with at least a portion of an image taken from a second perspective different from the first perspective.

13. The system of claim 8, wherein the control image comprises a combination of a first control image taken from a first perspective and a second control image taken from a second perspective different from the first perspective, and wherein the process image comprises a combination of a first process image taken from a third perspective and a second process image taken from a fourth perspective different from the third perspective.

14. The system of claim 8, wherein the detecting at least one difference comprises performing a pixel-by-pixel comparison between the control image and the process image.

15. The method of claim 1, wherein the at least one standardized marker comprises an ArUco marker.

16. The method of claim 1, wherein the causing the output image to be displayed comprises displaying the output image on a virtual reality headset.

17. The method of claim 1, wherein the candidate blobs are limited to blobs that are roughly conic section in shape.

18. The system of claim 8, wherein the at least one standardized marker comprises an ArUco marker.

19. The system of claim 8, wherein the causing the output image to be displayed comprises displaying the output image on a virtual reality headset.

20. The system of claim 8, wherein the candidate blobs are limited to blobs that are roughly conic section in shape.

* * * * *